Patented Nov. 27, 1951

2,576,448

UNITED STATES PATENT OFFICE 2,576,448

PRODUCTION OF PHENYLTRICHLOROSILANE

William H. Daudt, Midland, Mich., assignor to Dow Corning Corporation, Midland, Mich., a corporation of Michigan No Drawing. Application October 3, 1949, Serial No. 119,387

2 Claims. (Cl. 260—448.2)

This invention relates to the preparation of phenyltrichlorosilane.

The most direct method for synthesizing phenyltrichlorosilane would be that of reacting benzene with silicon tetrachloride. This method should also be the most economical way in which to produce the silane. In spite of these advantages, no commercially successful method for so producing phenylthrichlorosilane has heretofore been devised. Past attempts to carry out the synthesis have given negative results or at best exceedingly poor yields of the desired product.

The applicant's copending application, Serial Number 119,386 filed concurrently herewith and assigned to the same assignee as the instant case, now abandoned discloses and claims a method of preparing phenyltrichlorosilane by reacting benzene and silicon tetrachloride in the presence of silicon. This application relates to a method of preparing phenyltrichlorosilane by carrying out the reaction in the presence of a metal.

In accordance with this invention, benzene is reacted with silicon tetrachloride at a temperature between 200° C. and 500° C. and at a pressure of at least 75 p. s. i., in contact with a metal of groups two to eight inclusive of the Periodic Table, which metal lies above hydrogen in the electromotive series of metals.

Benzene and silicon tetrachloride react under the above conditions to produce phenyltrichlorosilane and HCl. The metal reacts with hydrogen chloride to produce a metal halide and hydrogen. Thus, the HCl is removed from the reaction mixture as it is formed and this prevents cleavage of phenyltrichlorosilane. Exceedingly poor yields of phenyltrichlorosilane are obtained under the above conditions unless a hydrogen chloride acceptor is present.

Any metal which will displace hydrogen from acids may be employed to remove hydrogen chloride from the reaction mixture. Examples of metals which are operative are calcium, barium, strontium, magnesium, zinc, chromium, cadmium, manganese, aluminum, tin, iron, cobalt, nickel and lead. The alkali metals will act as hydrogen halide acceptors, however, these metals are undesirable because they also react with chlorosilanes to form polymeric compounds having Si–Si linkages.

Preferably the amount of metal added to the reaction mixture should be at least sufficient to react with all of the hydrogen chloride produced. Since reaction between the metal and HCl is a surface phenomenon improved yields are obtained when granulated or powdered metals are employed and when the amount of metal is in excess of the theoretical amount necessary to react with the hydrogen chloride.

Under the above conditions of temperature and pressure, reaction between the benzene and silicon tetrachloride begins at once. At temperatures below 200° C. the rate of reaction is too slow to be practicable while temperatures above 500° C. are undesirable commercially.

In order to produce significant amounts of phenyltrichlorosilane, the pressure during reaction should be at least 75 p. s. i. The upper pressure limit is not critical but normally in practice the pressures do not exceed 2500 p. s. i.

If desired, catalysts such as aluminum chloride or boron trichloride may be employed in order to increase the rate of reaction. The presence of such a catalyst is particularly beneficial at temperatures in the lower part of the defined range. When aluminum is employed as the metal, aluminum chloride will be formed in situ. The catalysts are usually employed in amount from 0.1 mol percent to 15 mol percent based upon the total amount of benzene and silicon tetrachloride.

The utility of phenyltrichlorosilane as an intermediate in the production of siloxanes is well known.

The following examples are illustrative only.

Example 1

.10 g. mol of benzene, .10 g. mol of $SiCl_4$, .05 g. mol of granulated zinc and .01 g. mol of aluminum chloride were placed in a glass lined 118 ml. bomb. The bomb was rocked and heated overnight at 300° C. to 350° C. at a pressure of 450 p. s. i. to 500 p. s. i. The bomb was cooled and the liquid product was distilled whereupon phenyltrichlorosilane, boiling point 190° C. to 210° C. at 740 mm. was obtained.

Example 2

0.1 g. mol of benzene, 0.1 g. mol of silicon tetrachloride, .05 g. mol of magnesium turnings and .02 g. mol of aluminum chloride were heated from 14 to 16 hours in a rocker-bomb at a temperature of 300° C. to 350° C. and a pressure of 300 p. s. i. to 550 p. s. i. The liquid reaction product was distilled whereupon phenyltrichlorosilane, boiling point 195° C. to 205° C., was obtained.

Example 3

0.1 g. mol of benzene, 0.1 g. mol of silicon tetrachloride, .033 g. mol of aluminum turnings and 0.1 g. mol of aluminum chloride were placed in a rocker-bomb and heated 14 to 17 hours at 350° C. at a pressure of 500 p. s. i. The liquid reaction product was distilled and there was obtained phenyltrichlorosilane boiling at 190° C. to 210° C. at 740 mm.

Example 4

Example 3 was repeated except that no aluminum chloride was added. In this run the aluminum chloride was formed from the aluminum turnings during the reaction. Upon distillation of the liquid reaction product, phenyltrichlorosilane was obtained.

Example 5

0.1 g. mol of benzene, 0.1 g. mol of silicon tetrachloride, .033 g. mol of iron filings and 0.01 g. mol of aluminum chloride were added to a rocker-bomb and heated 14 to 17 hours at 350° C. and 500 p. s. i. Upon distillation of the liquid reaction product, phenyltrichlorosilane was obtained.

Example 6

When 1 g. mol of benzene, 1 g. mol of silicon tetrachloride, 0.1 g. mol of boron trichloride and 0.5 g. mol of magnesium turnings are heated in the bomb for 17 hours at 350° C., phenyltrichlorosilane is obtained.

Example 7

When 1 g. mol of benzene, 1 g. mol of silicon tetrachloride and 6 g. mols of magnesium turnings are heated at a temperature of 450° C. at a pressure of 1500 p. s. i. for 18 hours, phenyltrichlorosilane is obtained.

That which is claimed is:

1. The method of preparing phenyltrichlorosilane which comprises reacting benzene with silicon tetrachloride at a temperature of from 200° C. to 500° C. at a pressure of at least 75 p. s. i. in contact with a metal of groups two to eight inclusive of the Periodic Table, which metal lies above hydrogen in the electromotive series of metals, said metal being present in amount at least sufficient to react with all the hydrogen chloride produced.

2. The method of preparing phenyltrichlorosilane which comprises reacting benzene with silicon tetrachloride at a temperature of from 200° C. to 500° C. at a pressure of at least 75 p. s. i. in contact with a catalyst selected from the group consisting of aluminum chloride and boron trichloride and a metal of groups two to eight inclusive of the Periodic Table, which metal lies above hydrogen in the electromotive series of metals, said metal being present in amount at least sufficient to react with all the hydrogen chloride produced.

WILLIAM H. DAUDT.

REFERENCES CITED

The following references are of record in the file of this patent:

UNITED STATES PATENTS

| Number | Name | Date |
| --- | --- | --- |
| 2,379,821 | Miller | July 3, 1945 |
| 2,405,019 | Dalin | July 30, 1946 |